Figure 3:
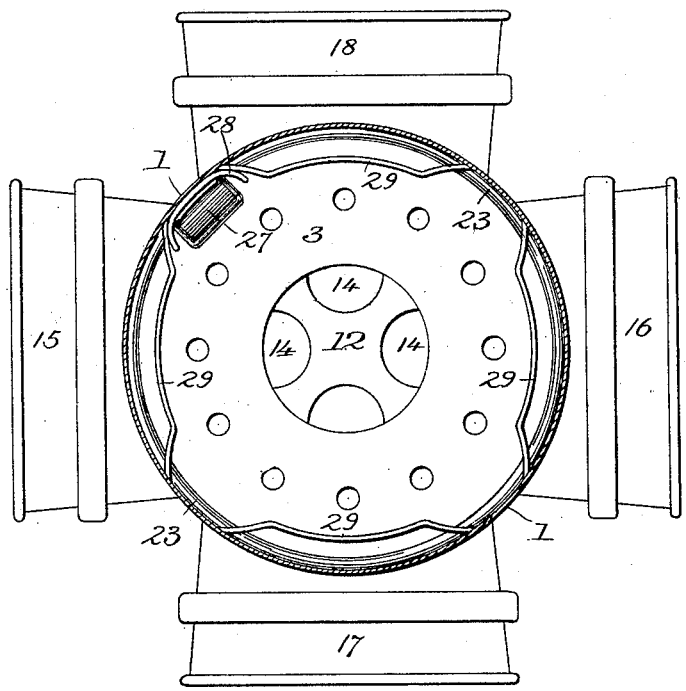

(No Model.) 3 Sheets—Sheet 1.
W. S. HAMM.
LANTERN.
No. 594,791. Patented Nov. 30, 1897.
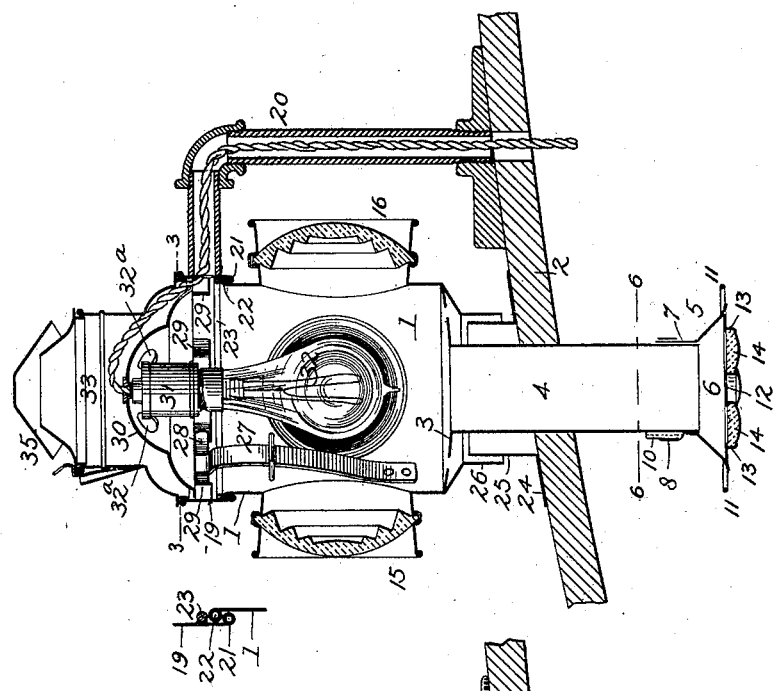
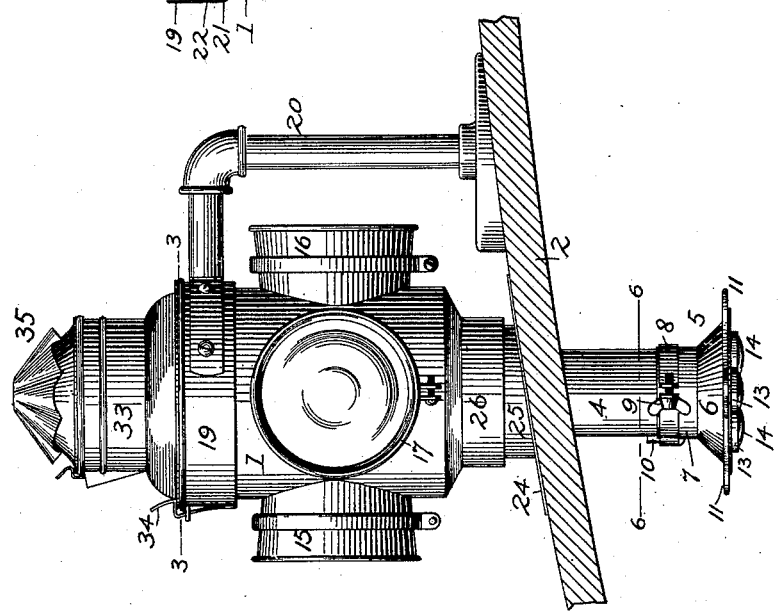
Witnesses:
Sidney P. Hollingsworth
Neil R. Parkins.
Inventor:
William S. Hamm (No Model.) 3 Sheets—Sheet 2.

W. S. HAMM.
LANTERN.

No. 594,791. Patented Nov. 30, 1897.

Witnesses
Sidney P. Hollingsworth
Neil R. Parkins.

Inventor
William S. Hamm,
by his Attorneys (No Model.) 3 Sheets—Sheet 3.

W. S. HAMM.
LANTERN.

No. 594,791. Patented Nov. 30, 1897.

Witnesses
Sidney R. Hollingsworth
Neil R. Parkins.

Inventor
William S. Hamm,
by his Attorney

UNITED STATES PATENT OFFICE.

WILLIAM S. HAMM, OF CHICAGO, ILLINOIS.

LANTERN.

SPECIFICATION forming part of Letters Patent No. 594,791, dated November 30, 1897.

Application filed June 1, 1897. Serial No. 638,960. (No model.)

*To all whom it may concern:*

Be it known that I, WILLIAM S. HAMM, of Chicago, in the county of Cook and State of Illinois, have invented certain new and useful Improvements in Lanterns, of which the following is a full, clear, and exact description, reference being had to the accompanying drawings and to the numerals of reference marked thereon.

My invention relates to a signal-lantern, more especially to such as is provided with a plurality of differently-colored lenses and mounted on the outside of a street-car or other vehicle to indicate the route taken or to be taken, or the classification of the car, or to give any signal prearranged and understood by railroad officials, or the public. Such a lantern is usually adapted to be rotated so as to present in front a lens of the required color, the rotation being effected from the platform of or within the car and the lantern being provided with means for indicating to the motorman or other operator the positions of the lenses of the respective colors.

My invention is applicable to lanterns whether illuminated through the medium of electricity, oil, or other illuminant.

One object of this invention is to produce a lantern for signaling purposes having a plurality of differently-colored lenses arranged radially of its body in a horizontal plane and illuminated through the medium of a single light, preferably that from an incandescent electric lamp fixed against rotation and around which the lamp-body with its differently-colored lenses is caused to revolve. It will be understood that the colored lenses are employed for night signaling; but in order to adapt the lantern for day signaling the interior surface of the hood or ring surrounding each lens is painted of a color corresponding to that of its inclosed lens, the color being readily detected at a considerable distance and giving an effective signal. The body of the lantern adjacent to each lens may be painted of a color corresponding with that of the lens.

In order to retain the lantern in any one of its operative positions, an automatic locking mechanism is employed between the lantern-body and the support which holds it in position and which also sustains the electric lamp. This locking mechanism is of such character as to hold the lantern against rotary or other movement when set to its desired position, but to yield and allow the lantern to turn when the operator wishes to change the signal.

The second object of my invention is to provide a convenient and effective device for indicating to the motorman or other operator the positions occupied by the several signal-lenses, thereby preventing danger, confusion, and inconvenience which might result from the exhibition ahead of the wrong signal or the inability of the operator to detect at a glance and with unerring accuracy the position of the several signals, and particularly that of the one operative at the time.

The indicating device preferably employed consists of a tube opening into the lantern, through which tube rays of light from the lamp pass, the bottom of this tube, which is generally situated above the operator's head, being closed by a cap with projections, which cap forms a handpiece for rotating the lantern. Inserted within the bottom of the cap are small transparent or translucent glasses or jewels corresponding in number, color, and position with the lenses of the lantern, which glasses or jewels, on being illuminated by the light passing down the tube, will indicate to the operator at a glance the color of the lens operative at the time or the lens displayed as a signal, and also whether the lamp is burning with effectiveness. This indicator is of especial value when used on any part of a car from which light is excluded or which is insufficiently illuminated, and when so used not only serves its main purpose of showing the positions of the signal-lenses, but also that of illuminating to a certain extent the part of the car in which it is placed.

It is essential in lanterns of this character using electricity as an illuminating agent that the electric lamp shall be fixed and not capable of rotation, for by rotation the filament would be liable to be broken and unless some more or less complicated system of brushes or switches were used the insulated covering of the wires would be in danger of destruction or impairment in value by rubbing together as the lamp was revolved, the result of which would be short-circuiting of the current.

Under my preferred construction the top of the lantern is hinged, and upon turning it back free access is had to the electrical fittings, which may be readily removed for repair, replacement, or for cleaning the interior of the lantern and lenses, which latter, being corrugated on their inner sides, readily collect dust and dirt, which must be frequently and thoroughly removed to insure clear signals.

Figure 4:
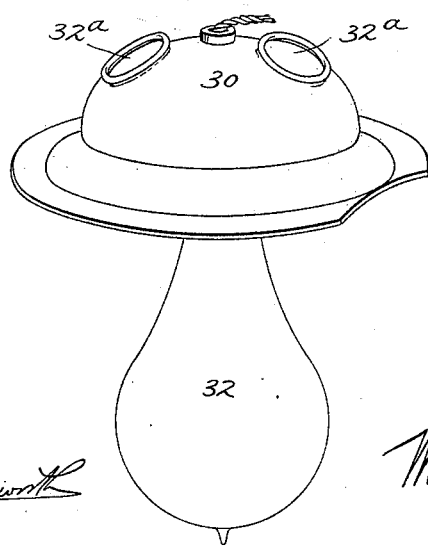
Figure 5:
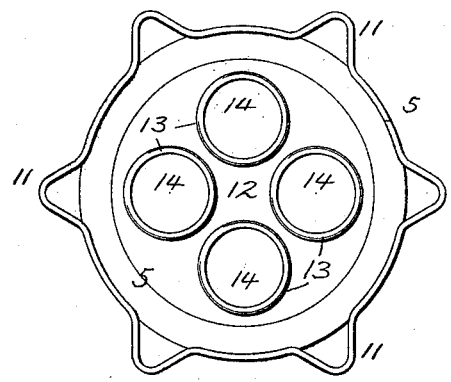
Figure 6:
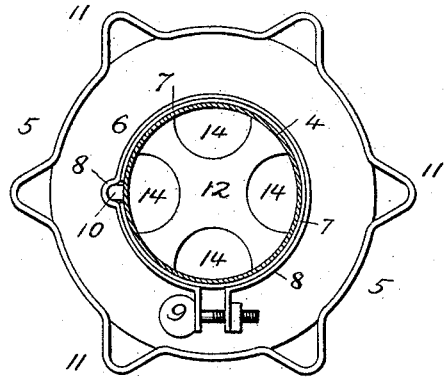
Figure 7:
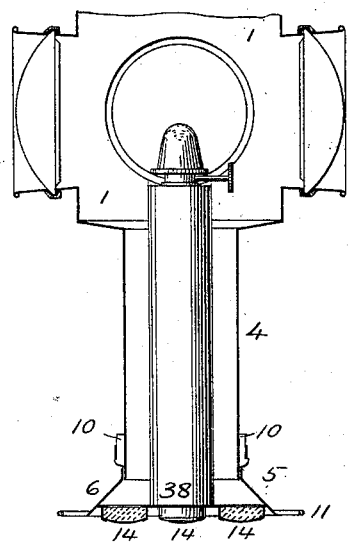
Figure 8:
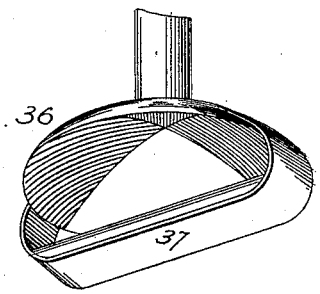

In the accompanying drawings, forming a part hereof, Figure 1 is an elevation of my improved lantern in position on the roof of a car, the roof being shown in section. Fig. 2 is a vertical section through the same. Fig. 3 is a horizontal section on the line 3 3 of Figs. 1 and 2. Fig. 4 is a perspective view of a detail. Fig. 5 is a bottom view of the preferred form of indicator. Fig. 6 is a horizontal section on the line 6 6 of Figs. 1 and 2. Figs. 7 and 8 show modifications.

Similar numerals indicate similar parts in the respective figures.

1 is the body of the lantern, preferably cylindrical, mounted on the roof 2 of a street-car. From the bottom 3 of the lantern depends a tube 4 through the roof 2, so as to be in position over the platform and within easy reach of the motorman, conductor, or other operator. The situation of the indicator will of course depend upon that of the lantern, and, as has been stated, the latter may be placed so that the indicator will be brought within the car. On the lower end of the tube 4 is attached a handpiece 5, consisting of a frusto-conical portion 6 and a cylindrical socket 7. A clamping-band 8 surrounds the socket 7 and when tightened by a screw 9 engages with a lug 10 on the tube 4 to lock the handpiece 5 in place. The socket 7 is slotted, as shown in Fig. 8, to receive the lug 10, in order to keep the handpiece from turning upon the tube. Projections 11 serve as a handhold for the operator and enable him to firmly grasp the handpiece and turn it, when desired, so as to rotate the body of the lantern and the indicating device.

A plate 12, secured within the bottom of the frusto-conical portion 6, is, as shown in Fig. 5, provided with sockets 13, each of which contains a glass or jewel 14 of a different color and which corresponds in radial position with the lens of the same color in the body of the lantern. The lenses of the lantern are here shown four in number, each of which is framed in a lens-tube, the four lens-tubes being numbered 15, 16, 17, and 18. Each lens, as has been heretofore mentioned, is of a different color, the axes of the lenses lying in the same horizontal plane. The inner surfaces of the projecting portions of the lens-tubes are painted in colors corresponding with those of the lenses framed therein.

Loosely surrounding the lantern-body and near its top is a ring 19, held in place by a support 20 of any suitable construction, but here shown tubular, and extending upwardly from the car-roof. The lower edge of the ring 19 is beaded or flanged interiorly, upon which bead or flange 21 the lantern-body, which in turn is provided with an outwardly-turned bead or flange 22 at its upper edge, is supported and upon which it rotates when the handpiece 5 is operated. A stop, here shown in the form of a circular wire 23, is secured within the ring 19 to retain the lantern-body therein and prevent its vertical movement. A plate 24, affixed to the car-roof, has a neck or collar 25, over which a collar 26, projecting from the bottom of the lantern-body, extends, this arrangement preventing the entrance or beating of water into the car through the opening in the roof through which the tube 4 passes.

Arranged between two lens-openings an arm 27, preferably of spring metal, is attached within the body of the lantern, near its bottom, the arm carrying the shoe 28 at its upper end, the ends of the shoe extending laterally and being turned backward, as indicated, the arm forming, in connection with other features hereinafter described, means for locking the lantern-body after it has been revolved to the desired position to bring any required lens to the forward or operative position. The means employed in connection with the spring-arm 27 and its shoe 28 are four projecting plates 29, attached to the ring 19, each plate having inclined ends, as shown. The projecting plates 29 are separated so as to provide four depressions of such shape as to receive the shoe 28, and when the lantern-body is in position to project the light through any particular lens in the desired direction the shoe 28 will be between two of the said projecting plates 29, as seen in Fig. 3, and will be there retained by the force of the spring-arm 27. When the lantern is turned to bring another lens in operative position, the shoe 28 will ride up the inclined end of the projecting plate 29 next in the direction in which it is moved and over which plate it will slide as the lantern is turned until it drops into the next depression, and so on until a lens of the desired color has been brought in position to give the required signal.

A dome-shaped cover 30 rests upon the projecting plates 29 and is provided with a socket 31 to receive an incandescent electric lamp 32, which extends downwardly into the lantern-body. The cover 30 is provided with openings $32^a$ for the convenient removal of the cover, the openings providing finger-holds. The conductors for the incandescent lamp pass through the top of the cover 30 and through the ring 19 into the tubular support 20, through which they pass into the car-body and connect with any generating system.

A cap 33 is hinged to the ring 19 and fastened, when closed, by the spring-latch 34, a hinged ventilator 35 being placed above the cap 33 for the escape of heated air from the interior of the lantern, or more particularly where oil is used as the illuminating agent for the exit of the products of combustion.

It will be seen from the foregoing that when the lamp is in position on the car and the electric current has been turned on light from the incandescent lamp 32 will pass through the colored lenses and also down the central tube, illuminating the glasses or jewels in the handpiece 5. The motorman or other operator upon looking at the handpiece, which in its preferred position will be above his head, will know what colored lens is being exhibited in front, this being indicated by the position of the glasses or jewels 14.

Instead of using the illuminated handpiece 5 to show the position of the lenses an imperforate cup or disk 36, provided with a handle 37, such as is illustrated in Fig. 8, may be substituted. In this modified form of my invention the lower face of the disk or cup-shaped plate 36 is quartered and painted in colors corresponding with those of the lenses. This modification, while effective in operation during the day, is not as applicable as is the illuminated indicator for use at night or where employed in a darkened part of a car.

While I prefer to use electricity as the illuminating agent, it is obvious that my invention is applicable to a lantern in which oil, gas, or other similar illuminant is used. The invention is adapted for the use of oil, &c., by attaching a socket 38 to the inside of the handpiece 5 and inserting an ordinary lamp or burner therein, as shown in Fig. 7, the oil-pot being made of such diameter as to provide a space between it and the tube 4, through which space the rays of light may pass to the indicator glasses or jewels 14.

The adaptation of this lantern to the use of either electricity or oil as the illuminating agent is an important consideration, inasmuch as a road having its system equipped with oil-lamps may readily substitute electricity by removing the oil-pot and burner and substituting the electrical fittings, thus saving the expense of buying lamps specially constructed for electricity, or vice versa.

While my invention is particularly applicable to a signal-lamp for railway use, more especially on city and suburban roads, it is equally well adapted to any description of lantern or lamp having lenses of different colors and which is intended to be rotated in order to bring any particular lens to operative or effective position and to indicate the same—as, for instance, in stations or signal-towers or on ships, especially war vessels of the modern type, where it is believed there are many uses to which this invention may be put. It is apparent that the device admits of changes in mechanical construction not involving invention, and such may readily suggest themselves to the skilled mechanic.

Having described my invention, I claim—

1. In a signal-lantern, the combination of a revoluble body having a plurality of signals, a source of light within the body, and an indicator illuminated by the source of light, revolving with the body and displaying the same signals as the lantern, and in the same relative position, substantially as set forth.

2. In a signal-lantern, the combination of a revoluble body having a plurality of signals, a source of light within the body and a transparent or translucent indicator illuminated by the source of light, revolving with the body and displaying the same signals as the lantern, and in the same relative position, substantially as set forth.

3. In a signal-lantern, the combination of a revoluble body, a source of light therein, a plurality of signals secured to the body in the path of the rays of light, an indicator secured to and turning with the body, signals in the indicator similar to the signals on the body and illuminated by the same source of light, and means for revolving the lantern.

4. In a signal-lantern, the combination of a revoluble body, a source of light therein, a plurality of signals secured to the body in the path of the rays of light, an indicator secured to and turning with the body, signals in the indicator corresponding to the signals on the body, and illuminated by the same source of light, means for revolving the lantern, and means for locking the lantern in a working position, substantially as set forth.

5. In a signal-lantern, the combination of a revoluble body, a source of light therein, a plurality of colored signal-glasses secured to the body and illuminated by the light, a tube secured to the body of the lantern and opening thereinto beneath the source of light, signal-glasses in the lower end of the tube corresponding to the signal-glasses in the lantern both as to color and position, and means for rotating the lantern, substantially as set forth.

6. In a signal-lantern, the combination of a revoluble body, a source of light therein, a plurality of signal-glasses secured to the body and illuminated by the light, a tube opening into the body of the lantern beneath the source of light, a handpiece secured to the tube for rotating the lantern and signal-glasses in the handpiece illuminated by the source of light, substantially as set forth.

7. In a signal-lantern adapted to be placed on the roof of a car or other vehicle, the combination of a revoluble body having signal-glasses, a tube secured to the bottom of the body, opening thereinto and passing through the roof of the vehicle, a handpiece detachably secured to the tube in position to be operated, and signal-glasses in the handpiece, substantially as set forth.

8. In a signal-lantern, the combination of a fixed support secured to a car or other vehicle, a ring attached to the support, a lantern-body carried by and adapted to turn in said ring, and an electric lamp detachably supported by the fixed ring and extending into the lantern, substantially as set forth.

9. In a signal-lantern, the combination of a fixed support secured to a car or other vehicle, a ring attached to the support and forming a part thereof, a lantern-body carried by and adapted to turn in said ring, a source of light detachably supported by the fixed ring and extending into the lantern, a tube opening into the bottom of the body and an indicator on the bottom of the tube, substantially as set forth.

10. In a signal-lantern, the combination of a fixed hollow support secured to the roof of a car or other vehicle, a ring attached to the support, a signal-lantern supported by and adapted to turn in said ring, an electric lamp detachably supported against rotation by the fixed ring, and extending into the lantern, conductors from the electric lamp passing through the fixed support, and means for rotating the lantern, substantially as set forth.

11. The combination of a signal-lantern adapted to rotate in a fixed standard, a removable plate supported by the standard and carrying an electric lamp, and conductors from the electric lamp passing through the standard, substantially as set forth.

12. In a signal-lantern, the combination of a fixed support, a revoluble body having signals adapted to turn in the said fixed support, a plate supporting an electric lamp and its connections carried by the fixed support, and a cover for the fixed support to inclose the lantern and protect the electric lamp and its connections, substantially as set forth.

In testimony whereof I hereunto set my hand and seal.

WILLIAM S. HAMM. [L. S.]

Witnesses:
HENRY O. MILLER,
G. L. WALTERS.